Patented May 1, 1951

2,551,436

UNITED STATES PATENT OFFICE 2,551,436

PROCESS FOR POLYMERIZATION OF ROSIN

Burt L. Hampton, De Ridder, La., assignor to Crosby Chemicals, Inc., De Ridder, La., a corporation of Mississippi No Drawing. Application October 3, 1949,
Serial No. 119,390

12 Claims. (Cl. 260—99.5)

The present invention provides certain improvements in the treatment of wood or gum rosin with a view to improving the properties of the rosin, particularly with reference to greater stability towards oxidation, higher melting point, greater viscosity in solution, lower acid number, and other improved properties which result from treating the rosin so as to polymerize unsaturated constituents present in the rosin as customarily obtained.

The method employed in accordance with the present invention involves the treatment of wood or gum rosin with reagents and under conditions as will be described in greater particularity hereinafter, whereby the melting point of the rosin becomes raised and the treated rosin is rendered suitable for many uses for which ordinary rosins are undesirable on account of the relatively low melting point thereof.

As has been indicated above, the improved properties obtained in accordance with the process of the present invention result from a catalytic polymerization of the rosin, with attendant reduction in the amounts of unsaturated constituents normally present in rosin. This catalytic polymerization has been effected by treating the rosin with a metallic chloride (preferably anhydrous), derived from a metal capable of forming an amphoteric hydroxide, and with heat at a temperature below that at which any large proportion of the rosin will be decomposed but sufficient to effect polymerization in the presence of the metallic chloride, and fractionating the product to separate rosin from polymerized rosin. Examples of chloride catalysts which have been employed or suggested for this purpose are stannic chloride, aluminum chloride and zinc chloride.

The use of such metallic chloride catalysts as those mentioned above, is attended with difficulties in operational procedure, and the results have not been fully satisfactory. A major difficulty has been that of obtaining an intimate contact between the rosin or the rosin ester and the metal chloride, by reason of the immiscibility of the metal chloride with, or insolubility in, the rosin or rosin ester or solution of rosin or rosin ester being treated. As a result, it is not possible to obtain the desired effectiveness of polymerization. In addition, when employing certain solvents, precipitation of a sludge of high polymer has occurred frequently, thereby rendering recovery of the polymerized product more difficult.

The foregoing, and other difficulties attendant upon the use of metallic chloride catalysts, as pointed out above, are obviated in accordance with the present invention, by the utilization of an improved catalyst, the discovery of which as a catalytic material for the polymerization of rosin, was made in the course of the investigations leading to the present improved contribution to the art.

The present invention, therefore, has for one of its objects the provision of an improved catalyst for the polymerization of rosin, which obviates the disadvantages of metal chlorides of the above-indicated types due to immiscibility and insolubility thereof with rosin and solutions of rosin being treated.

A further object of the invention is to provide an improved catalyst which will yield a resin of equal melting point and unsaturation as when stannic chloride is used, but at less cost; or, conversely, to provide a resin of higher melting point as when stannic chloride is used, but at approximately the same cost.

Further objects of the invention will become apparent as the description proceeds, and the features of novelty will be pointed out in particularity in the appended claims.

In accordance with the present invention, it has been found that instead of metallic chlorides of the above-indicated types, such as stannic chloride, for example, another derivative of tin, that is, chlorostannic acid possesses excellent catalytic properties for polymerizing rosin, obviating the difficulties and poor results attendant upon the use of stannic chloride; and in carrying out the present invention it has been found the equivalent amounts of tin in chlorostannic acid give higher melting point resins than when combined as in stannic chloride. The use of chlorostannic acid as polymerization catalyst for rosin yields a resin of equal melting point and unsaturation as is obtained when stannic chloride alone is used, but at less cost; or, as has been noted above, conversely, it provides obtaining a resin of higher melting point than is obtained when stannic chloride is used but at approximately the same cost.

The chlorostannic acid employed may be produced by any suitable process. Thus it may be prepared by mixing stannic chloride with concentrated hydrochloric acid in such proportions that the water in the acid shall be in relation to the stannic chloride as $SnCl_4 : 6H_2O$. 100 parts of stannic chloride require 62.15 parts of 33 per cent hydrochloric acid. Combination ensues, the mass becomes hot and softens, and hydrogen chloride is evolved. About eight parts more of dry hydrogen chloride then are slowly passed into the mixture, which then is cooled. The whole solidifies to a scaly crystalline mass of chlorostannic acid, melting at 19.2° C. See also, "Inorganic Preparations" by Henderson and Fernelius, page 118, published by McGraw Hill Book Co., (1935). In accordance with the present process, the amount of such acid catalyst which is employed may vary from about 0.3 per cent to about 15 per cent, based on the weight of the rosin used, the preferred limits being from approximately 1 per cent to approximately 6 per cent.

In carrying out the present invention, there may be used as starting material any form of rosin, such as wood rosin, American gum rosin, French gum rosin, or equivalent materials, such as abietic acid, pimaric acid, sapinic acid, or the like. It is preferred to carry out the polymerization reaction in an inert solvent, but it may be carried out on the molten rosin. A variety of suitable solvents is available, such as benzene, toluene, mineral spirits, VMP naphtha, ethylene chloride, glacial acetic acid, and many others known to the art. Various concentrations of rosins may be used, solutions of rosins in solvent varying from about 25% to 100% rosin being usable; but it is preferred to use concentrations varying from about 70% to about 85%.

In carrying out the improved process of the present invention, a solution of rosin in a desired solvent is produced, and the catalyst, i. e., chlorostannic acid or bromostannic acid, is added at a temperature which preferably is below the boiling point of the solvent. The temperature of the resulting mixture then is adjusted to the desired point. The temperature of the reaction may vary from about 20° C. to about 160° C., and the time of reaction may vary from about thirty minutes to about fifty hours. Generally speaking, the lower the temperature, the larger will be the amount of catalyst required. A desirable temperature is found to be between about 70° C. and 140° C., using from about one per cent to about six per cent catalyst. After the reaction has progressed for a satisfactory period of time, the reaction mass is diluted to facilitate washing, and then is washed first with dilute mineral acid and finally several times with water. If the reaction has been carried out using molten rosin, it will be necessary to put the polymerized rosin in solution for washing. After the solution has been washed, it next is distilled, with steam if desired, to remove the solvent.

The final product, after removal of the solvent, will have a higher melting point, a higher viscosity in solution, and a decreased unsaturation.

The improved process of the present invention will be understood more readily from the following specific illustrative samples.

*Example I*

Four hundred parts of WG wood rosin with an acid number of 166 and a Ring and Ball melting point of 76° C. were dissolved in 100 parts of acetic acid, and 6.8 parts of chlorostannic acid, $H_2SnCl_6.6H_2O$, of melting point about 19° C. were added. The resulting solution then was heated at about 115° C. for six hours. At the end of the reaction period, 700 parts of VMP naphtha were added and the solution was washed with warm 2% sulphuric acid and then four times with warm water. The solvent was removed with steam, the final temperature of the resin being 200° C. This polymerized rosin graded K, had an acid number of 153, and a Ring and Ball melting point of 103° C.

*Example II*

Another experiment as carried out in exactly the same manner as the preceding example, except that four parts of anhydrous stannic chloride (equivalent to the stannic chloride in 6.8 parts of chlorostannic acid) were used, instead of the chlorostannic acid in Example I. The resulting resin graded K, had an acid number of 162, and a Ring and Ball melting point of 95.5° C.

This example (Example II) was run as a comparative test with the results obtained in Example I. It will be seen that equivalent amounts of stannic chloride combined as in chlorostannic acid and used along do not have the same polymerizing action.

*Example III*

Four hundred parts of WG wood rosin with the same properties as the rosin used in Example I were dissolved in 100 parts of VMP naphtha, and 5.3 parts of chlorostannic acid were added. The resulting solution was heated at 130° C. for six hours, then diluted with 300 parts of solvent, washed with 2 per cent sulphuric acid at about 60° C., and finally washed three times with hot water. The solvent was removed with steam, the final temperature of the resin being 200° C. The results were: Grade K; acid number 159; Ring and Ball melting point 94° C.

*Example IV*

Four hundred parts of WG wood rosin with the same properties as that used in Example I were dissolved in 100 parts of VMP naphtha and 2.6 parts of chlorostannic acid were added. The solution then was heated at 125—130° C. for six hours, then diluted with 300 parts of solvent and washed with 2 per cent sulphuric acid at about 60° C. A small amount of white, flocculent precipitate can be either withdrawn at the bottom, or filtered from the resin solution. After finally washing three times with hot water, the solvent was removed with steam, the final temperature of the resin being 200° C. The results were: Grade K; acid number 162; Ring and Ball melting point 88° C.

The polymerized rosin prepared as described in the preceding examples may be refined further, if desired. Refining methods used may consist of passing solutions of the rosin through beds of selective adsorbents, by extracting with selective solvents, or by heat treating.

As has been indicated above, instead of chlorostannic acid, there may be employed bromostannic acid as catalyst in a similar manner. Also, it will be understood that in the appended claims the term "rosin" as used therein is intended to include any form of rosin, such as wood rosin, American gum rosin, French gum rosin, or equivalent materials such as abietic acid, pimaric acid, and sapinic acid, which have been indicated above to be suitable raw or starting materials for the improved process of this invention.

It will be understood also that while the foregoing description and illustrative examples represent preferred amounts of reactants and reaction conditions, the specific condition set forth above may be varied from those illustrated under cer-

What is claimed is:

1. The method of polymerizing rosin, which comprises treating rosin with a halo-stannic acid selected from the group consisting of chloro- and bromo- stannic acid and with heat at a temperature below that at which any large proportion of the rosin will be decomposed but sufficient to effect polymerization in the presence of the said acid.

2. The method of polymerizing rosin which comprises treating rosin in liquid phase with from approximately 0.3% to about 15%, based on the weight of rosin, of a catalyst consisting of a halo-stannic acid, the acid being selected from the group consisting of chloro- and bromostannic acid with heat at a temperature below that at which any large proportion of the rosin will be decomposed but sufficient to effect polymerization in the presence of the said acid.

3. The process of polymerizing rosin, which comprises treating rosin in liquid phase with from approximately 1% to approximately 6% of a catalyst selected from the group consisting of chlorostannic acid and bromostannic acid for from approximately thirty minutes to approximately fifty hours and at a temperature ranging from approximately 70° C. to approximately 140° C.

4. The process of polymerizing rosin, which comprises dissolving the rosin in a solvent therefor, adding to the resulting solution at an elevated temperature but below the boiling point of the solvent, from approximately 0.3% to approximately 15% based on the weight of rosin employed, of chlorostannic acid as catalyst, and heating the resulting mixture to a temperature ranging from about 20° C. to about 165° C. for from approximately thirty minutes to approximately fifty hours.

5. The process of polymerizing rosin, which comprises heating rosin in liquid phase with from approximately 1% to approximately 6% of chlorostannic acid based on the amount of rosin employed for from approximately thirty minutes to approximately fifty hours and at a temperature ranging from approximately 70° C. to approximately 140° C., washing the resulting reaction mass first with mineral acid and then with water, and subjecting the resulting washed material to steam distillation.

6. The process for polymerizing rosin, which comprises heating rosin in liquid phase, with from approximately 1% to approximately 6% of chlorostannic acid based on the amount of rosin employed, for from approximately thirty minutes to approximately fifty hours and at a temperature ranging from approximately 70° C. to approximately 140° C., and washing the resulting reaction mass first with mineral acid and then with water.

7. The process for polymerizing rosin, which comprises heating a solution of rosin in an inert solvent, the solution ranging in rosin concentration from approximately 70% to approximately 85%, with from approximately 1% to approximately 6% of chlorostannic acid based on the amount of rosin employed, for from approximately thirty minutes to approximately fifty hours at a temperature ranging from approximately 70° C. to approximately 140° C., diluting the resulting reaction mass, washing the resulting diluted mass first with a mineral acid and then with water, and removing solvent from the resulting washed material by steam distillation.

8. The process for polymerizing rosin, which comprises heating rosin until molten, adding to the molten rosin from approximately 1% to approximately 6% of chlorostannic acid based on the amount of rosin employed for from approximately thirty minutes to approximately fifty hours at a temperature ranging from approximately 70° C. to approximately 140° C., dissolving the resulting polymerized rosin in an inert solvent, diluting the resulting solution, and washing the resulting solution first with mineral acid and then with water.

9. The process for polymerizing rosin, which comprises heating rosin in liquid phase with chlorostannic acid as catalyst for a time and at a temperature sufficient to effect polymerization of the rosin.

10. The process for polymerizing rosin, which comprises heating rosin in liquid phase with from approximately 0.3% to approximately 15% of a catalyst selected from the group consisting of chlorostannic acid and bromostannic acid for from approximately thirty minutes to approximately fifty hours at a temperature of from approximately 20° C. to approximately 165° C.

11. The process as claimed in claim 10 wherein the rosin is dissolved in an inert solvent, the resulting solution having a rosin concentration of from approximately 25% to 100%

12. The process as claimed in claim 10 wherein the catalyst is added to the rosin in molten condition.

BURT L. HAMPTON.

REFERENCES CITED

The following references are of record in the file of this patent:

UNITED STATES PATENTS

| Number | Name | Date |
|---|---|---|
| 2,074,192 | Schnorf | Mar. 16, 1937 |
| 2,293,915 | Borglin | Nov. 25, 1941 |
| 2,454,796 | Hampton | Nov. 30, 1948 |

OTHER REFERENCES

Ephraim, Inorganic Chemistry, 4th ed. page 331, Interscience Publishers (1947).